March 1, 1949.  D. D. GRIEG  2,462,859
INTERFERENCE ELIMINATING SYSTEM
Filed March 18, 1944  2 Sheets-Sheet 1
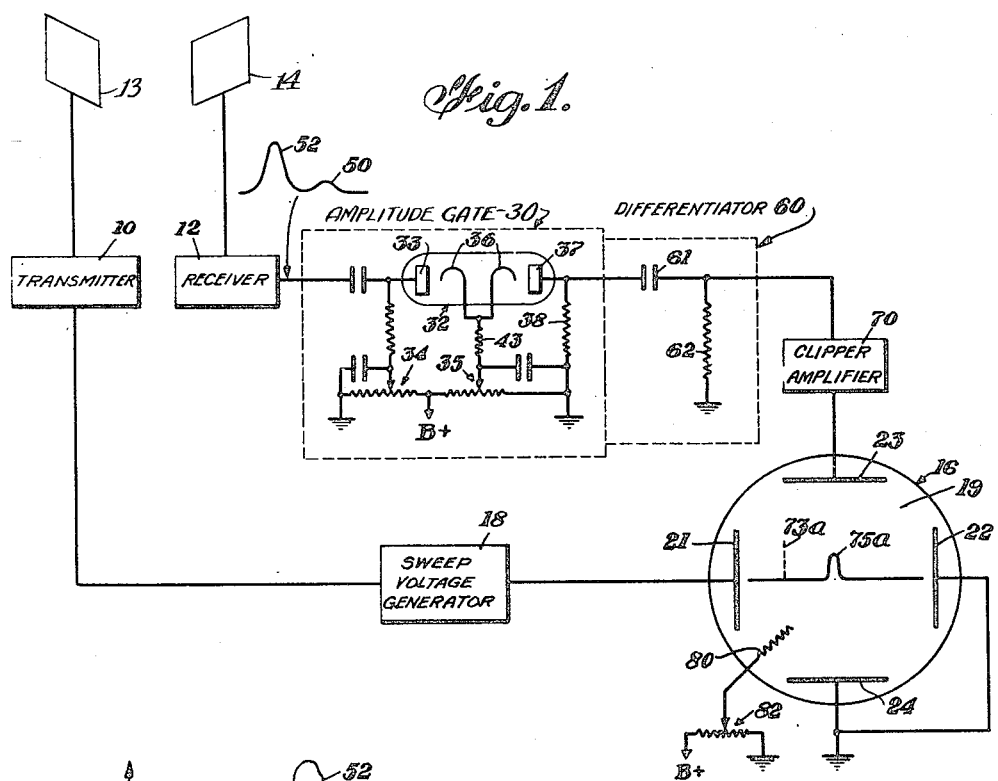
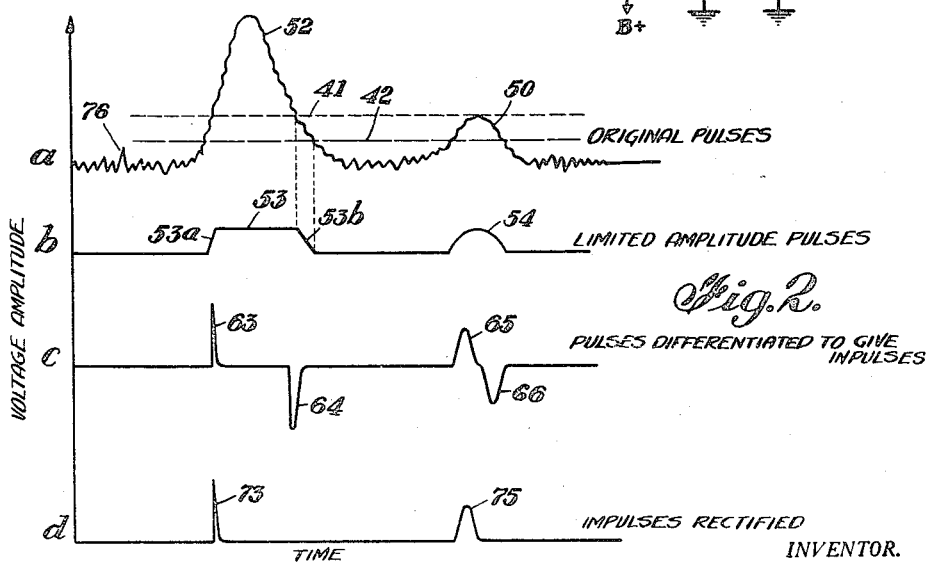
INVENTOR.
DONALD D. GRIEG
BY
ATTORNEY

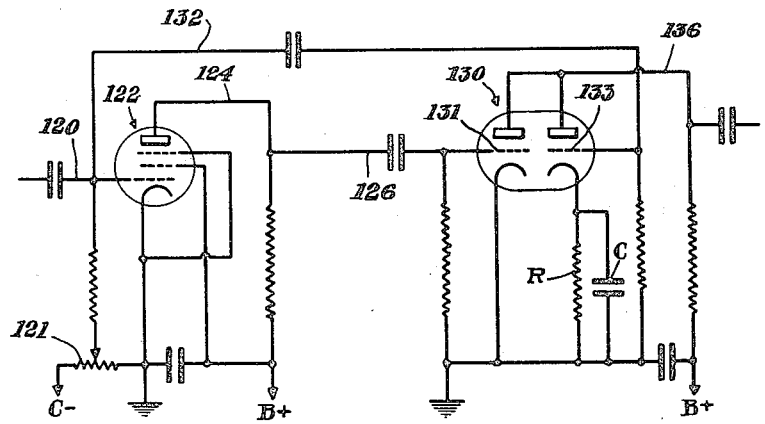
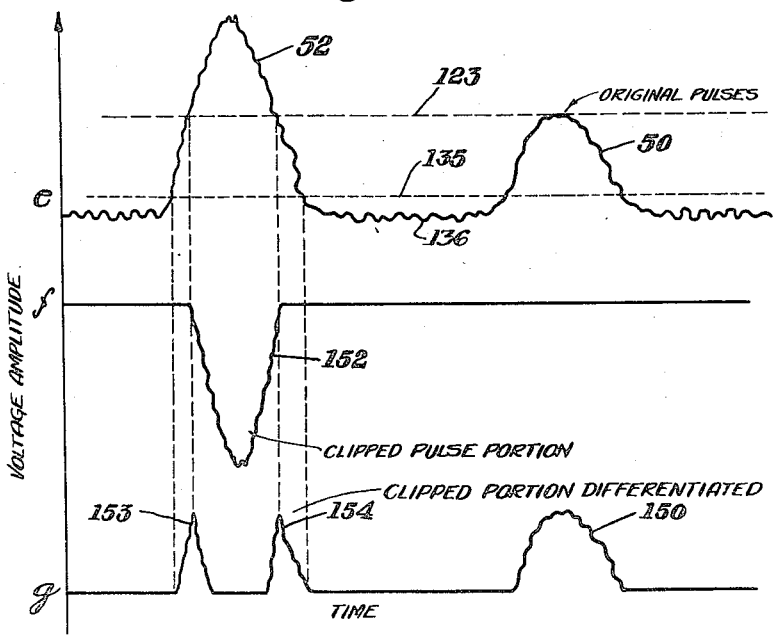

Patented Mar. 1, 1949

2,462,859

UNITED STATES PATENT OFFICE 2,462,859

INTERFERENCE ELIMINATING SYSTEM

Donald D. Grieg, Forest Hills, N. Y., assignor to Federal Telephone and Radio Corporation, New York, N. Y., a corporation of Delaware Application March 18, 1944, Serial No. 527,073

14 Claims. (Cl. 343—5)

1

This invention relates to radio locating and ranging systems and more particularly to a method and means for minimizing the effect of interference and other unwanted pulses in the receiving and indicating apparatus of such systems.

Radio locating and ranging systems operate by transmission of recurring impulses and detection of echo pulses caused by the impulses being reflected from the surfaces of fixed obstacles such as large buildings, shore lines, mountains, etc., and/or moving obstacles such as aircraft and ships. For detection of movable obstacles the reflections caused by fixed obstacles often result in larger echo pulses and are commonly referred to as non-intentional interference. Such interference pulses as well as intentional interference pulses caused by enemy pulse jamming attempts often render it difficult to detect and observe the smaller echo pulses caused by aircraft and ships.

It is one of the objects of my invention to provide a method and means for substantially eliminating large unwanted pulse indications from the indicating apparatus of radio locating and ranging systems without adversely affecting the useful indications of the smaller pulses.

A further object of the invention is to provide the deflection circuit of a cathode ray oscillograph with translation means by which the energy of the large unwanted pulses can be translated into impulses having a ratio of amplitude-to-width considerably greater than the corresponding ratio of the impulses produced from small wanted pulses whereby proper control of the cathode ray intensity operates to substantially eliminate the impulses produced from the unwanted pulses.

The above objects and others ancillary thereto will become more apparent upon consideration of the following detailed description to be read in connection with the accompanying drawings, in which:

Fig. 1 is a schematic block and wiring diagram of a radio locating and ranging system in accordance with my invention;

Fig. 2 is a graphical illustration used for explaining the principles of the pulse translator feature of Fig. 1;

Fig. 3 is a schematic wiring diagram of a further form of pulse translator that may be used in the system of Fig. 1; and Fig. 4 is a graphical illustration of the operating steps of the translator circuit of Fig. 3.

Referring to Fig. 1 of the drawings, the radio locating and ranging system is shown to include a transmitter 10 and a receiver 12 together with

2 antennas 13 and 14, respectively. The transmitter may be of the usual character used in such systems for generation and translation of recurring impulses. The receiver 12 may be of any known form capable of receiving echo pulses caused by reflection of the impulse by obstacles within the range of the system. The antennas 13 and 14 may be of any suitable directional type. A cathode ray oscillograph 16 is provided together with a sweep voltage generator 18 which is controlled from the transmitter 10 so as to cause the cathode ray beam to sweep, say from left to right between plates 21 and 22, across the screen 19 of the oscillograph in synchronism with each transmission of an impulse. The oscillograph includes deflecting plates 23 and 24 across which the energy of the pulses received at 12 is applied, the pulse energy causing the cathode ray beam to be deflected during the sweep movement thereof to trace the shape of the deflecting pulse or pulses.

According to my invention, I provide a pulse translating circuit between the receiver 12 and the deflecting electrode 23 which so translates the larger unwanted interference pulses as to cause the substantial elimination of the tracings of such pulses without adversely affecting the indications of smaller wanted pulses. The circuit shown in Fig. 1 is one form of translator that may be used for this purpose. It includes a gate clipper 30 which as shown comprises a diode-double-limiter tube 32 of the character disclosed in the copending application of E. Labin and applicant, Serial No. 437,530, filed April 3, 1942. The input anode 33 is connected to the movable contact of a potentiometer 34 whereby the anode may be biased either positively or negatively, as desired. A second potentiometer 35 supplies adjustably controlled negative bias to the cathodes 36. A load resistor 38 is connected between the output anode 37 and ground.

In operation, the anode 33 is preferably biased with respect to the cathodes 36 and ground so as to permit a space discharge path between these elements to conduct for only a portion of the voltage swing of the applied pulses. This results in a limiting or clipping operation at a level such as 41, curve a, Fig. 2, whereby the clipping potential of the input pulses appears across the biasing resistor 43 associated with the potentiometer 35. The cathodes 36, however, are normally biased negatively so that there is a normal conductive path provided between the cathodes 36 and the anode 37. It follows that the pulse appearing across the resistor 43 will be conducted through the discharge path, that is, from the cathodes 36 to the anode 37, so long as the magnitude of this voltage is less than the anode potential. This produces a second limiting level 42 below the limiting level 41 produced by the first conductive path.

It will be clear from the foregoing description that the double limiting operation of the tube 32 provides a gate the levels of which are adjustable. By varying the amount of negative bias applied to the cathodes 36, the spread of the gate may be adjustably selected. If it is desired to change the effective position of the gate, adjustment of the potentiometer 34 will serve this purpose without changing the spread of the gate. Obviously, if desired, the tube 32 may be caused to operate as a simple limiter such as by limiting the pulse energy at level 41 with respect to the zero axis 44. Assuming, however, that the potentiometers of the circuit are adjusted to provide for gate clipping at the limits 41 and 42, the output of the gate clipper will correspond to the pulse shapes of curve b. It should be noted, however, that the limits 41 and 42 are so chosen as to include the peak portion of the small wanted pulse 50 thereby clipping the base portion of the unwanted pulse 52. The gate clipping operation translates the large pulse 52 into a substantially trapezoidal pulse shape 53, while the curved peak portion of the wanted pulse 50 is preserved as indicated at 54. The pulse output of the gate clipper 30 is applied to a differentiator circuit 60 including a capacitance 61 and a resistance 62 to ground, providing a time constant such that the substantially vertical leading edge 53a of the trapezoidal pulse shape is translated into a sharp narrow impulse 63 while the less steep trailing edge 53b is translated into a less sharp negative impulse 64 as indicated in curve c. The curved pulse shape 54 is also translated into positive and negative pulse portions 65 and 66 which, however, conform generally to the curved shape of the pulse 54 with the exception that the resulting pulse portions are narrower.

The pulse output of the differentiator as indicated by curve c is preferably applied to a clipper amplifier 70 whereby the negative portions and, if desired, the lower base portions of the impulses of curve c are clipped off. This clipping amplifying operation results in the impulses 73 and 75 of curved d, which correspond to the upper portions of the impulses 63 and 65. The energy of the positive impulses of curve d is applied to the deflecting electrode 23 whereby the beam is deflected at a rate corresponding substantially to the ratio of amplitude-to-width of the impulses.

It will be clear from the graph of Fig. 2 that large unwanted interference pulses are translated into impulses of substantially less width and larger amplitude than the impulses resulting from the translation of the small wanted pulses. When the beam is caused to trace out the shape of the narrow high amplitude impulses, the tracing will be at a high rate substantially proportional to the ratio of amplitude-to-width. Thus, the tracing 73a on the screen 19 of Fig. 1 will be at a much greater rate than the tracing 75a. By controlling the brilliance of the beam, such, for example, as by controlling the voltage of the grid 80 by means of potentiometer 82, the tracing 73a may be eliminated while maintaining the tracing 75 at a satisfactory brilliance.

From the foregoing description, it will be clear that by controlling the gate limits of the tube 32 large unwanted interference pulses may be substantially eliminated while the smaller pulses, the peak portions of which are included within the gate limits, are indicated in satisfactory brilliance.

It will also be observed that the lower limit 42 of the gate clipping operation may be used to eliminate low amplitude interference such as indicated at 76.

In Figs. 3 and 4, I illustrate the circuit and operating steps of another form of pulse translator along the lines of the "Discriminator circuit" disclosed in my copending application, Serial No. 487,071, filed May 15, 1943, which issued April 29, 1947, as Patent No. 2,419,548, that may be used in the system of Fig. 1 in place of the gate clipper, differentiator and clipper circuits 30, 60 and 70. Curve e of Fig. 4 represents an input wave of echo pulses of various amplitudes similarly as in the case of curve a, Fig. 2. Pulse 50 is a wanted pulse of a given amplitude while pulse 52 is an unwanted pulse of greater amplitude. This wave is applied from receiver 12, Fig. 1, through connection 120 to a threshold and amplifying clipper 122 which preferably is adjusted by control resistor 121 to threshold clip the wave of curve e at a level 123. This level 123 is chosen preferably to just exceed the amplitude of wanted pulse 50 although considerable latitude of adjustment may be had depending upon the amplitude difference between wanted and unwanted pulses. The level 123, of course, must be selected below the crest of the unwanted pulse or pulses. The output of the clipper stage 122 is taken from the plate connection 124 so that the upper portion of pulse 52 thus clipped is inverted in phase as indicated by the pulse energy 152 of curve f. This inverted energy is applied to an input connection 126 of a mixer stage 130 to a grid 131 of the mixer.

As shown in Fig. 3, the mixer stage 130 comprises a conventional double triode stage. The input pulse energy of connection 120 is also applied to the mixer stage 130 through a connection 132 to a second grid 133. The mixer stage is preferably provided with a threshold level 135 by the voltage developed across the resistor-condenser network R—C which serves to eliminate lower amplitude pulse fluctuations 136 occurring between pulses. The output anode connection 136 of the mixer stage may be applied direct to the deflecting plate 23 of the oscillograph of Fig. 1 or it may first be applied to one or more amplifier stages whichever is desired.

From the foregoing description, it will be clear that the pulse energy represented by curves e and f are mixed in the mixer stage 30. This mixing operation causes the inverted pulse energy of curve f to cancel an equal portion of the corresponding pulse energy of curve e. The mixer also threshold clips the wave at level 135. This all results in an output wave for the mixer stage according to curve g. The large unwanted pulse 52 is thus translated into two narrow width impulses 153 and 154 of high amplitude-to-width ratio whereas the small wanted pulse 50 is translated into an impulse 150 of substantially the same amplitude-to-width ratio as that of pulse 50. The narrow width impulses 153 and 154 cause the cathode ray beam to have a much greater tracing speed than pulse 150. By properly adjusting the beam intensity, the tracing on the screen for impulses 153 and 154 will be substantially eliminated while the tracing for impulse 150 will be easily discernable.

While I have described above the principles of my invention in connection with specific apparatus, it is to be clearly understood that this description is made only by way of example and not as a limitation on the scope of my invention as set forth in the accompanying claims.

I claim:

1. In an electrical pulse energy indicating system having a cathode ray oscillograph whereby the cathode ray beam traces the shapes of pulses applied to the deflecting circuit thereof; the method of substantially eliminating the tracings of unwanted pulses of amplitude greater than wanted pulses comprising translating the energy of the wanted pulses into impulses having a wanted amplitude-to-width ratio, translating the energy of the unwanted pulses into impulses having an unwanted amplitude-to-width ratio, said wanted and unwanted amplitude-to-width ratios of the impulses being obtained as a result of the greater than wanted amplitude of said unwanted pulses, deflecting the cathode ray beam in its sweep according to the potential of said wanted and unwanted impulses, the speed of deflection of the beam being substantially directly proportional to the ratio of amplitude-to-width of said impulses, and controlling the brilliance of the beam to substantially eliminate the tracings produced in response to the unwanted impulses.

2. In an electrical pulse energy indicating system having a cathode ray oscillograph, a sweep circuit for controlling the sweep of the cathode ray beam, and a deflecting circuit to control the beam in its sweep so as to trace the shapes of energy pulses applied thereto; the combination of means for substantially eliminating the tracing of unwanted pulses of amplitude greater than wanted pulses comprising means for translating the energy of said wanted and unwanted pulses into wanted and unwanted impulses respectively, the greater than wanted amplitude of said unwanted pulses being productive of ratios of the amplitude-to-width of the unwanted impulses which are considerably greater than the corresponding ratios of the wanted impulses, means to apply the energy of wanted and unwanted impulses to the deflecting circuit of said oscillograph, the speed of deflection of the beam being substantially directly proportional to the ratio of amplitude-to-width of the impulses, and means for controlling the brilliance of the beam to substantially eliminate the tracings produced in response to the unwanted impulses.

3. A system according to claim 2 wherein the means for translating the pulse energy includes means for clipping the pulse energy between two limits including therebetween, the peak portions of the wanted pulses, thereby translating the large unwanted pulses into substantially trapezoidally shaped pulses while maintaining substantially the initial shape of the small wanted pulses, means to differentiate the pulse energy resulting from the clipping operation to produce impulses from the trapezoidally shaped pulses which are of less width and greater amplitude than the impulses produced from said wanted pulses, and means to apply unidirectional impulses from the differentiating operation to the deflecting circuit of said oscillograph.

4. In an electrical pulse energy indicating system having a cathode ray oscillograph, a sweep circuit for controlling the sweep of the cathode ray beam, and a deflecting circuit to control the beam in its sweep to trace the shapes of the pulses applied thereto; the combination of means for substantially eliminating the tracing of unwanted pulses of amplitude greater than wanted pulses comprising means to limit the pulse energy at a level corresponding approximately to the amplitude of the wanted pulses thereby translating the large unwanted pulses into substantially trapezoidally shaped pulses as compared to the preservation of the curved shape of the peak portions of the wanted pulses, means for differentiating the resulting pulse energy whereby impulses of less width and greater amplitude are produced from the trapezoidal pulses than from the curved pulses, means to apply said impulses to said deflecting circuit to cause the beam to be deflected in its sweep according to the shape of said impulses, the speed of deflection of the beam being correspondingly greater for the impulses having the greater ratios of amplitude-to-width, whereby the tracings for the impulses corresponding to the large unwanted pulses are of less brilliance than the tracings of the impulses corresponding to said wanted pulses.

5. A system according to claim 4 wherein the differentiating means is such as to produce impulses of positive potential corresponding to the leading edges and impulses of negative polarity corresponding to the trailing edges of the pulses, the system further including means to limit clip the impulses of one polarity thereby leaving the impulses of the other polarity to control the deflection of the beam.

6. A system according to claim 4 wherein the means for limit clipping the pulse energy includes means for clipping the pulse energy between two levels which include therebetween, the peak portions of the wanted pulses.

7. In a radio locating and ranging system having a transmitter for transmission of recurring impulses, a receiver to receive echo pulses produced by the reflection of the transmitted impulses upon obstacles, a cathode ray oscillograph, means to produce a sweep voltage in synchronism with the transmission of impulses for control of the cathode ray beam of said oscillograph, and a deflection circuit for said oscillograph; pulse translating means for applying the pulse energy from said receiver to said deflecting circuit, said translating means being responsive to the differences in amplitude of the received pulses to translate the pulses greater than a predetermined amplitude into impulses the ratios of the amplitude-to-width thereof are greater than the corresponding ratios of the impulses produced from pulses smaller than said predetermined size, the speed of deflection of the beam in response to said impulses being substantially directly proportional to the ratio of amplitude-to-width, and means for controlling the brilliance of the beam to substantially eliminate the tracings produced by the pulses having the greater ratios.

8. A system according to claim 7 wherein the means for translating the pulse energy includes means for limiting the pulse energy to a level near the peaks of the wanted pulses thereby translating the pulses of greater amplitude into substantially trapezoidally shaped pulses as compared to the curved peak portions of the wanted pulses, means for differentiating the resulting pulse energy to produce impulses of less width and greater amplitude from the trapezoidally shaped pulses than from the curved pulses, whereby the amplitude-to-width ratios of the unwanted pulses are greater than the corresponding ratios of the wanted pulses.

9. A system according to claim 7 wherein the means for translating the pulse energy includes means for clipping the pulse energy between two limits including therebetween, the peak portions of the wanted pulses, thereby translating the large unwanted pulses into substantially trapezoidally shaped pulses while maintaining substantially the initial shape of the small wanted pulses, means to differentiate the pulse energy resulting from the clipping operation to produce impulses from the trapezoidally shaped pulses which are of less width and greater amplitude than the impulses produced from said wanted pulses, and means to apply unidirectional impulses from the differentiating operation to the deflecting circuit of said oscillograph.

10. A system according to claim 2 wherein the means for translating the pulse energy includes means for threshold clipping and inverting in phase a portion of the pulses having the greater than wanted amplitude, and means to mix the resulting inverted pulse energy of the unwanted pulses with the corresponding unwanted pulses from which the energy was clipped, thereby translating the large unwanted pulses to narrow impulses of an amplitude-to-width ratio higher than the corresponding ratio of the wanted pulse.

11. A system according to claim 7 wherein the means for translating the pulse energy includes means for threshold clipping and inverting in phase a portion of the pulses having the greater than wanted amplitude, and means to mix the resulting inverted pulse energy of the unwanted pulses with the corresponding unwanted pulses from which the energy was clipped, thereby translating the large unwanted pulses to narrow impulses of an amplitude-to-width ratio higher than the corresponding ratio of the wanted pulse.

12. In an electrical pulse energy indicating system having a cathode ray oscillograph, a sweep circuit for controlling the sweep of the cathode ray beam, and a deflecting circuit to control the beam in its sweep to trace the shapes of the pulses applied thereto; the combination of means for substantially eliminating the tracing of pulses of greater amplitude than wanted pulses comprising means to threshold clip and amplify the pulse energy of pulses having greater than wanted amplitude at a level corresponding approximately to the amplitude of the wanted pulses to obtain pulse energy of the unwanted pulses in resulting inverted form, means for mixing the inverted pulse energy of the pulses having greater than wanted amplitude with the corresponding unwanted pulses thereby translating the large unwanted pulses to narrow impulses of an amplitude-to-width ratio higher than the corresponding ratio of the wanted pulses, the impulse output of the mixing means resulting from the wanted pulses having approximately the same amplitude-to-width ratio as the wanted pulses, means to apply the impulse output of the mixing means to said deflecting circuit to cause the beam to be deflected in its sweep according to the shape of said impulses, the speed of deflection of the beam being correspondingly greater for the impulses having the greater ratios of amplitude-to-width, whereby the tracings for the impulses corresponding to the large unwanted pulses are of less brilliance than the tracings of the impulses corresponding to said wanted pulses.

13. A system according to claim 12 wherein the mixing means includes means for suppressing that part of the wanted and unwanted wave below the amplitude of the wanted wave.

14. In an electrical pulse energy indicating system having a cathode ray oscillograph, a sweep circuit for controlling the sweep of the cathode ray beam and a deflecting circuit to control the beam in its sweep so as to trace the shapes of the pulses applied thereto; the combination of means to translate the energy of a train of wanted and unwanted pulses wherein the unwanted pulses are of greater amplitude than the wanted pulses into wanted and unwanted impulses, respectively, said translating means being responsive to the greater than wanted amplitude of said unwanted pulses to be productive of ratios of the amplitude-to-width of the resulting unwanted impulses which are increased substantially with respect to the corresponding original ratios of the unwanted pulses while the ratios of the amplitude-to-width of the wanted impulses are approximately the same as the corresponding ratios of the wanted pulses, means to apply the energy of the wanted and unwanted impulses to the deflecting circuit of said oscillograph to cause the beam thereof to be deflected in its sweep according to the shape of said impulses, the speed of deflection of the beam being correspondingly greater for the impulses having the greater ratios of amplitude-to-width, whereby the tracings for the impulses corresponding to the large unwanted pulses are of less brilliance than the tracings of the impulses corresponding to said wanted pulses.

DONALD D. GRIEG.

REFERENCES CITED

The following references are of record in the file of this patent:

UNITED STATES PATENTS

| Number | Name | Date |
|---|---|---|
| 2,313,967 | Read | Mar. 16, 1943 |

FOREIGN PATENTS

| Number | Country | Date |
|---|---|---|
| 113,233 | Australia | June 2, 1941 |